(12) United States Patent
Ilie et al.

(10) Patent No.: US 7,374,345 B2
(45) Date of Patent: May 20, 2008

(54) SYSTEM FOR SECURING A ROLLER BEARING IN AXIAL DIRECTIONS

(75) Inventors: Dorin Ilie, Stratford (GB); David Ilgert, Stratford (GB); Michael Claassen, Romeo, MI (US)

(73) Assignee: FAG Kugelfischer AG, Schweinfurt (DE)

( * ) Notice: Subject to any disclaimer, the term of this patent is extended or adjusted under 35 U.S.C. 154(b) by 644 days.

(21) Appl. No.: 10/974,629

(22) Filed: Oct. 27, 2004

(65) Prior Publication Data

US 2005/0191002 A1    Sep. 1, 2005

Related U.S. Application Data

(60) Provisional application No. 60/515,200, filed on Oct. 28, 2003.

(51) Int. Cl.
*F16C 35/06*    (2006.01)
(52) U.S. Cl. ............... 384/537; 384/539; 384/903
(58) Field of Classification Search ............... 384/477, 384/482, 484, 486, 487, 537, 539, 903
See application file for complete search history.

(56) References Cited

U.S. PATENT DOCUMENTS

| 3,519,316 A | * | 7/1970 | Gothberg | 384/486 |
|---|---|---|---|---|
| 3,658,395 A | * | 4/1972 | Hallerback | 384/484 |
| 3,767,279 A | * | 10/1973 | Hallerback | 384/539 |
| 5,564,838 A | | 10/1996 | Caillault et al. | |
| 5,927,867 A | | 7/1999 | Niebling et al. | |
| 6,007,253 A | * | 12/1999 | Rutter | 384/539 |
| 7,073,950 B2 | * | 7/2006 | Vignotto et al. | 384/482 |
| 2003/0099419 A1 | | 5/2003 | Vignotto | |

FOREIGN PATENT DOCUMENTS

| DE | 15 10 920 | 12/1974 |
|---|---|---|
| DE | 197 13 333 | 10/1998 |
| DE | 198 60 345 | 7/2000 |
| DE | 199 29 536 | 1/2001 |
| DE | 102 46 527 | 6/2003 |
| EP | 0 852 299 | 7/1998 |
| FR | 2 118 612 | 7/1972 |
| GB | 2 351 534 | 1/2001 |

\* cited by examiner

*Primary Examiner*—William C Joyce
(74) *Attorney, Agent, or Firm*—Charles A. Muserlian

(57) ABSTRACT

System (1, 8, 20, 25, 30) for the securing of a roller bearing (2) in axial directions relative to a cylindrical seat (3), the system (1, 8, 20, 25, 30) with at least one first circumferential groove (4) of the seat (3) and with at least one securing ring (7, 19, 21, 22, 23), in which the securing ring (7, 19, 21, 22, 23) adjoins with a disk-form section (26, 27, 28, 29, 31) an axially outer side of a first bearing ring (10) of the roller bearing (2) and in which the securing ring (7, 19, 21, 22, 23) comprises elastically flexible first securing clips (11), projecting from the securing ring (7, 19, 21, 22, 23), which engage the circumferential groove (4).

14 Claims, 3 Drawing Sheets

SYSTEM FOR SECURING A ROLLER BEARING IN AXIAL DIRECTIONS

PRIOR APPLICATION

This application is based on provisional U.S. patent application Ser. No. 60/515,200 filed Oct. 28, 2003.

FIELD OF THE INVENTION

The invention relates to a system for securing a roller bearing in axial directions relative to a cylindrical seat, the system with at least one first circumferential groove of the seat and with at least one securing ring, and the securing ring adjoins with a disk-form section an axially outer side of the first bearing ring of the roller bearing, and the securing ring comprises elastically flexible first securing clips projecting from the securing ring, which clips engage the circumferential groove.

BACKGROUND OF THE INVENTION

Such a system is described in EPO 852 299 B1, which system serves for securing a wheel bearing unit in a wheelmount and secures the roller bearing in an axial direction in a seat of the wheelmount. The seat is developed cylindrically and is provided with at least one circumferential groove which is engaged by a securing ring with elastically flexible securing clips developed on a disk-form section of the securing ring. In one axial direction, the outer ring of the roller bearing is in contact with its axially outer side on the disk-form section. Consequently, the securing ring is an axial stop means for the bearing ring. In the other axial direction, the outer ring is axially stayed on a shoulder of the seat projecting radially into the bore of the seat. A seat formed in this way for a roller bearing is relatively elaborate and cost-intensive of production, since the shoulder makes difficult working the seat for the roller bearing.

OBJECTS OF THE INVENTION

It is an object of the invention to address the problem of providing a system for the axial securing of a roller bearing relative to a bearing seat, which permits the simple and cost-effective production of a seat for the roller bearing and which is simple to mount.

This and other objects and advantages of the invention will become obvious from the following detailed description.

THE INVENTION

The invention is suitable for the securing of a roller bearing on a shaft or for the securing of a roller bearing in a bore of a housing. If the seat of a roller bearing is to be secured on a shaft, the shaft has a circumferential groove, which is engaged by a securing clip extending from a securing ring. Simultaneously, further securing clips extend into a circumferential groove on the inside of the inner ring of the roller bearing. The seat of a roller bearing is preferably to be secured in a bore of a housing which bore comprises on the inside a circumferential groove, which is engaged by a securing clip projecting from the securing ring. Further securing clips engage simultaneously a circumferential groove on the outside of the outer ring of the roller bearing.

The system of the invention for the securing of a roller bearing over the outer ring in a housing facilitates the fabrication of the bore of the seat, since the bore can be fabricated as a throughbore without a shoulder.

The roller bearing is bilaterally axially secured on the seat relative to the shaft or alternatively in the seat of the housing. The term shaft is understood as all possible machine elements, such as axles, shafts and shaft ends as well as pivots, which are rotatably supported in a housing or about which the housing rotates.

DETAILED DESCRIPTION OF THE DRAWING

Figure 1:
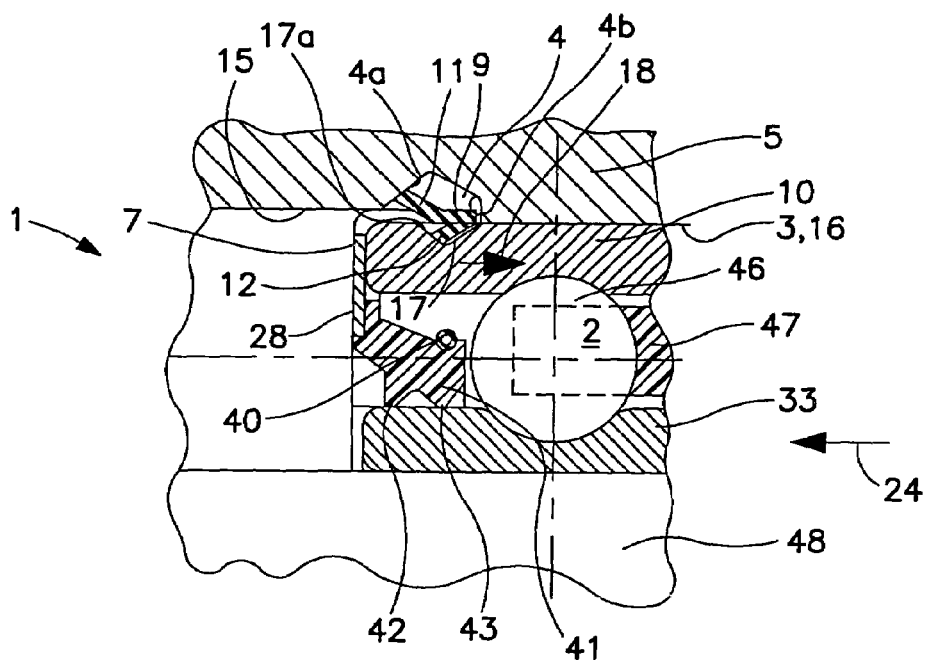
FIG. 1 illustrates a system for axial securing of a roller bearing on a seat of the outer bearing ring in a bore, with a securing ring on which a seal is disposed, seal-packing the roller bearing relative to the inner bearing ring, shown in longitudinal section.

With the systems 1, 8, 20, 25, 30, FIGS. 1, 3, 4, 5 and 6 show embodiment examples of the system of the invention for securing a roller bearing 2 in the axial directions relative to a seat 3 in a housing 5, only indicated, of a gearing. In this application, the roller bearing 2 is formed at least of an outer bearing ring 10, an inner bearing ring 33, or roller bodies 46 and a cage 47. The seat 3 is provided with two cylindrical regions 15 and 16. The cylindrical region 16 receives the outer bearing ring 10 and the region 15 has a greater diameter than region 16 and is an integral part of systems 1, 8, 20, 25, 30. Each system 1, 8, 20, 25, 30 comprises a securing ring 7, 19, 21, 22, 23 of thin sheet metal, which ring is shaped in the form of a square-angle in the depictions of FIGS. 1, 3, 4, 5 and 6.

A lateral side 9 of securing rings 7, 19, 21, 22, 23 is at least regionally developed in the form of a hollow cylinder. Each of the securing rings 7, 19, 21, 22, 23 is situated by means of the lateral side 9 on the outer bearing ring 10 of the roller bearing 2, radially between the bearing ring 10 and the housing 5 in region 15. The center axes, not shown, of the bearing ring 10 and of lateral side 9 are disposed superjacently and directed identically.

Figure 2A:
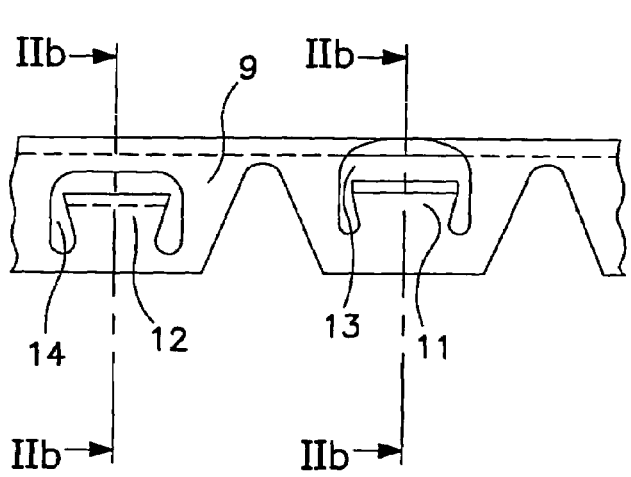
FIGS. 2a and 2b is the securing ring of the system of FIG. 1 as a component part shown partially and in cross-section.
Figure 2B:
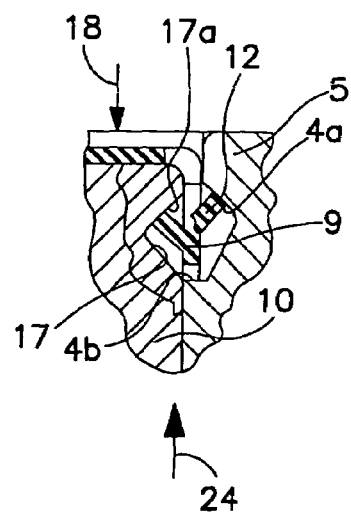

Extending from lateral side 9 are first securing clips 11 and second securing clips 12 (FIGS. 2a and 2b). As can be seen from FIGS. 2a and 2b, the securing clips 11 and 12 are produced by introducing U-shaped cutouts 13 or 14 into the hollow-cylindrical lateral side 9 and by the subsequent bending-out from lateral side 9. One of the securing clips 11 is followed in the circumferential direction by one of the securing clips 12. The securing clips 11 are set through radially outwardly and securing clips 12 radially inwardly such that these project either perpendicularly and radially inwardly or outwardly from the lateral side 9 or, as in the depictions according to FIGS. 1, 3, 4, 5 and 6, are each inclined toward the longitudinally directed shell lines of bearing ring 10 and of lateral side 9 such that they deviate from a right angle.

The securing clips 11 and 12 are elastically flexible so that either the securing clips 11 spring back into the cutouts 13 of the second lateral side 9 when the particular securing ring 7, 19, 21, 22, 23 is slid onto the outer bearing ring 10 in the axial direction marked with the direction arrow 18 in FIG. 2b, or alternatively, that the securing clips 12 spring back into the cutouts 14 when the particular securing ring 7, 19, 21, 22, 23 is slid into region 15 in the axial direction marked with direction arrow 18 (FIGS. 1, 2a, 2b).

From region 15, a circumferential groove 4 extends open radially inwardly, which is radially faced by a circumferential groove 17 in the outer bearing ring 10. According to the embodiment, the circumferential groove 17 is developed in the form of a V in longitudinal section. The particular securing clips 11 and 12 spring open during the mounting of the particular securing ring 7, 19, 21, 22, 23 in the radial direction and spring back into one of the circumferential grooves 4 of 17.

A wall 4a of the circumferential groove 4 is inclined at an acute angle relative to the cylindrical wall of region 15. On the wall 4a are stayed the securing clips 11 along the direction of the direction arrow 24, since the bearing ring 10 is axially in contact along the direction of the direction arrow 24 against one of the disk-form sections 26, 27, 28, 29, 31 of the particular securing ring 7, 19, 21, 22, 23, when the outer bearing ring 10 in the region 16, due to axial forces, tends to shift axially in the direction marked with direction arrow 24 (FIGS. 1, 2a, 2b).

A further wall 4b in the circumferential groove 4 is disposed opposite to wall 4a and terminates in region 15 relative to region 16. On wall 4b, the lateral side 9 is stayed in the direction of the direction arrow 18, since the bearing ring 10 is axially in contact in the direction of direction arrow 18 against the securing clips 12 on wall 17a of the circumferential groove 17 in the outer bearing ring if the outer bearing ring 10 in region 16, due to axial forces, tends to shift axially in the direction marked with the direction arrow 18 (FIGS. 1, 2a, 2b).

The securing rings 7, 19, 21, 22, 23 are preassembled in the mounting of the roller bearings 2 with one of the systems 1, 8, 20, 25, 30, either each on one roller bearing 2 and subsequently inserted with the roller bearing 2 into housing 5 or the securing rings 7, 19, 21, 22, 23 are each first secured in a region 15 or alternatively in a seat with a throughbore and the roller bearing 2 is subsequently inserted into housing 5. If the seat is developed as a throughbore, it is conceivable that the necessary structural space for a lateral side, similar to lateral side 9, of a securing ring is set up through steppings on the outer diameter of the outer bearing ring. Alternatively, the securing rings 7, 19, 21, 22, 23, in addition to the axial securing, are secured via securing clips with a press fit of lateral side 9 either on the bearing ring 10 or in region 15.

In system 1 of FIG. 1 for the securing of a roller bearing 2 in the axial directions relative to a seat 3 of housing 5, as described above, the one lateral side 9 is developed as a hollow cylinder. The other lateral side is formed by an apertured disk-form section 28, which transitions into the hollow-cylinder lateral side 9. Section 28 is bent from lateral side 9 at an angle inwardly in the radial direction and extends radially inwardly beyond the outer bearing ring 10. The outer bearing ring 10 is in contact on the front side on section 28 and, in this way, is axially obscured via the section 28 in one direction.

Section 28 is a reinforcement for a seal 41 provided with sealing lips 42 and 43. The sealing lips 42 and 43 are prestressed by means of a worm spring 40 radially against the bearing ring 33. By means of the sealing lips 42 and 43, the roller bearing 2 is "dynamically" protected against effects from outside and against loss of lubricant from the roller bearing 2.

Figure 3:
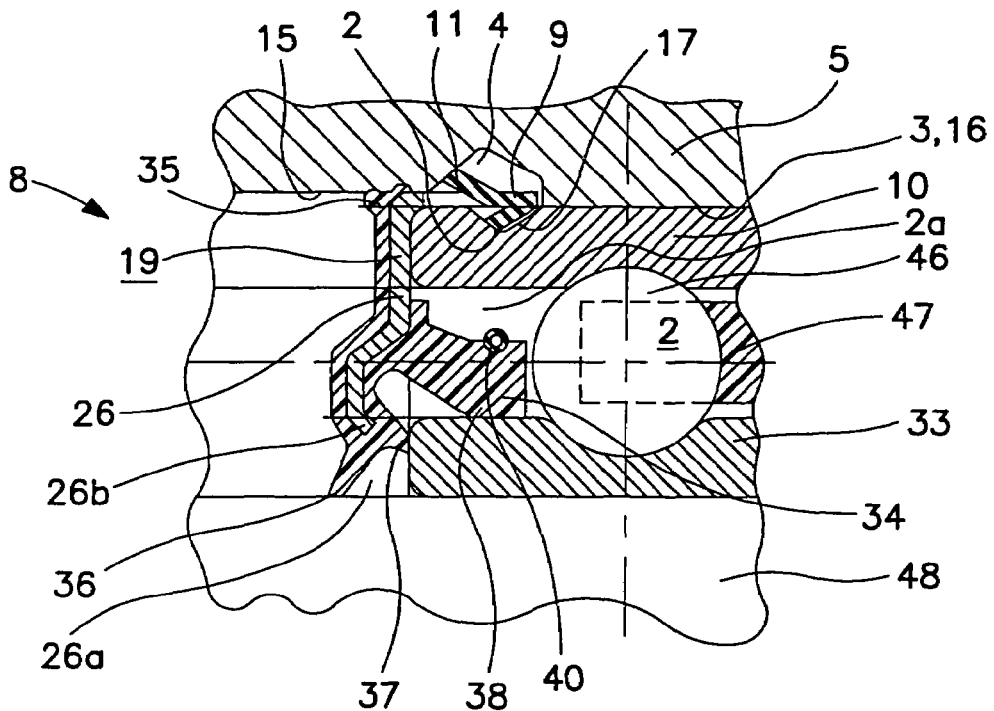
FIG. 3 is a further embodiment of a system for the axial securing of a roller bearing on a seat of the outer bearing ring in a bore, with a securing ring on which a seal is disposed, seal-packing the roller bearing relative to the shaft, relative to the inner bearing ring as well as relative to the bore, shown in longitudinal section.

In system 8 of FIG. 3, to secure a roller bearing 2 in the axial directions relative to a seat 3 in housing 5, as already described, the one lateral side 9 of the securing ring 19 is developed as a hollow cylinder. The other lateral side is formed by an apertured disk-form section 26, which transitions into the hollow cylindrical lateral side 9. Section 26 is first bent at an angle from lateral side 9 inwardly in the radial direction. The outer bearing ring 10 is in contact on the front side on section 26 and, in this way, is covered over axially in one direction by section 26. Section 26 is bent at right angles such that it becomes axially further spaced apart from the roller bearing 2 in its further course. Margin 26b of delimiting hole 26a in section 26 is lastly bent in the direction of the roller bearing 2. The radial interspace 2a between the outer bearing ring 10 and the inner bearing ring 33 is covered axially in one axial direction by section 26.

Section 26 is a reinforcement for a seal 34 which is of one or several elastomers which comprise a sealing bead 35, which is outwardly in contact against housing 5 and "statically" seals the roller bearing 2 relative to region 15. The seal 34 is provided with sealing lips 36, 37 and 38, of which the sealing lip 36 is radially prestressed against a shaft 48 only indicated in the drawing. The sealing lip 37 is axially in contact on the front side 32 of the bearing ring 33 and the scaling lip 38 is prestressed by means of a worm spring 40 radially against the bearing ring 33. The roller bearing 2 is "dynamically" protected by means of the sealing lips 36, 37, 38 against effects from outside and against loss of lubricant from roller bearing 2.

Figure 4:
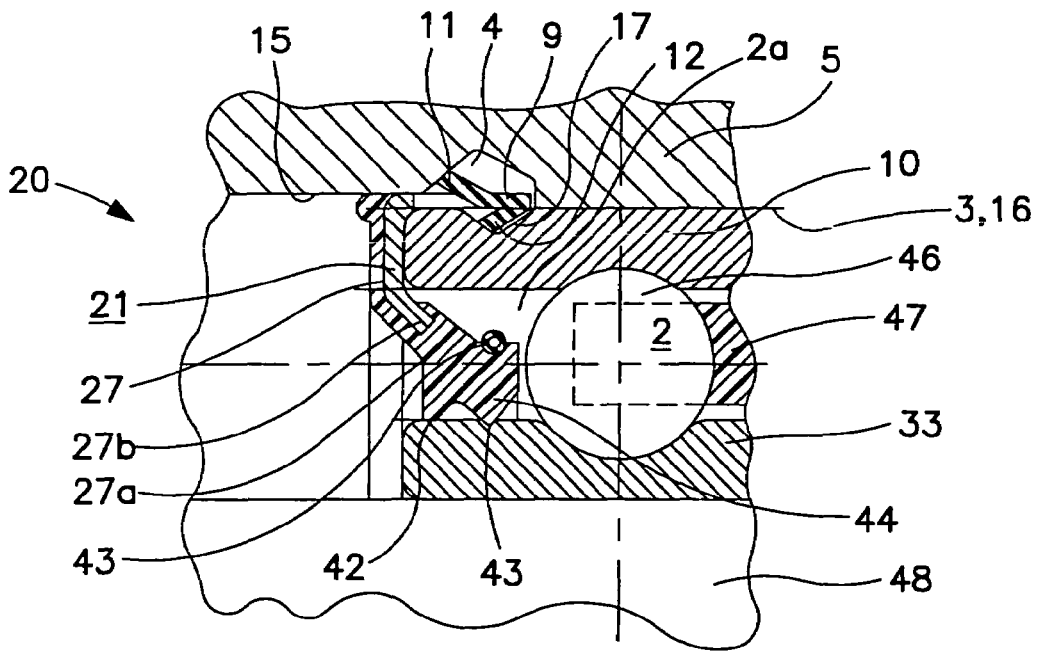
FIG. 4 is a further embodiment of a system for the axial securing of a roller bearing on a seat of the outer bearing ring in a bore, with a securing ring on which a seal is disposed, seal-packing relative to the bearing ring and relative to the bore, shown in longitudinal section.

In system 20 of FIG. 4 for the securing of a roller bearing 2 in the axial directions relative to a seat 3 in housing 5, as already described, the lateral side 9 of securing ring 21 is developed at least regionally in the form of a hollow cylinder. The other lateral side is formed by a section 27 in the form of an apertured disk, which transitions into the hollow-cylindrical lateral side 9. Section 27 is first bent at an angle from lateral side 9 inwardly in the radial direction. The outer bearing ring 10 is on the front side in contact on the section 27 and, in this way, is covered axially in one direction by section 27. In its further course, the margin 27b delimiting the hole 27a of section 27 is subsequently lastly bent into the direction of the roller bearing 2.

Section 27 is a reinforcement for a seal 44 which is of one or several elastomers which comprise a sealing bead 35, which is in contact radially outwardly against housing 5 and "statically" seals the bearing on the seat of the securing ring 21 against region 15. The seal 44 is provided with sealing lips 42 and 43 which are radially prestressed against the bearing ring 33 by means of a worm spring 40. By means of the sealing lips 42 and 43, the roller bearing 2 is "dynamically" protected against effects from outside and against loss of lubricant from the roller bearing 2.

Figure 5:
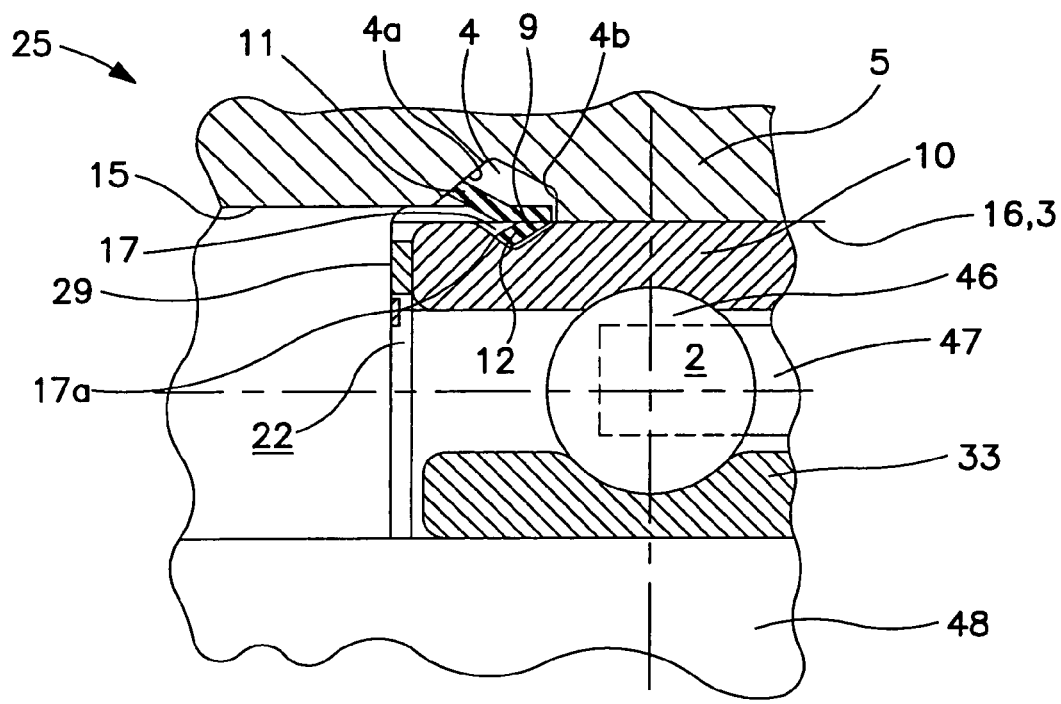
FIG. 5 is a further embodiment of a system for the axial securing of a roller bearing on a scat of the outer bearing ring in a bore, with a securing ring which is exclusively provided for the securing of the roller bearing on the seat.

The system 25 of FIG. 5 is provided exclusively from the securing of a roller bearing 2 in the axial directions relative to a seat 3 in housing 5 without additional sealing function. Section 29 on securing ring 22 is first bent at an angle from lateral side 9 inwardly in the radial direction. The outer bearing ring 10 is in contact at the front side on section 29 and is, in this way, stayed by section 29 axially in one direction and at least partially covered.

Figure 6:
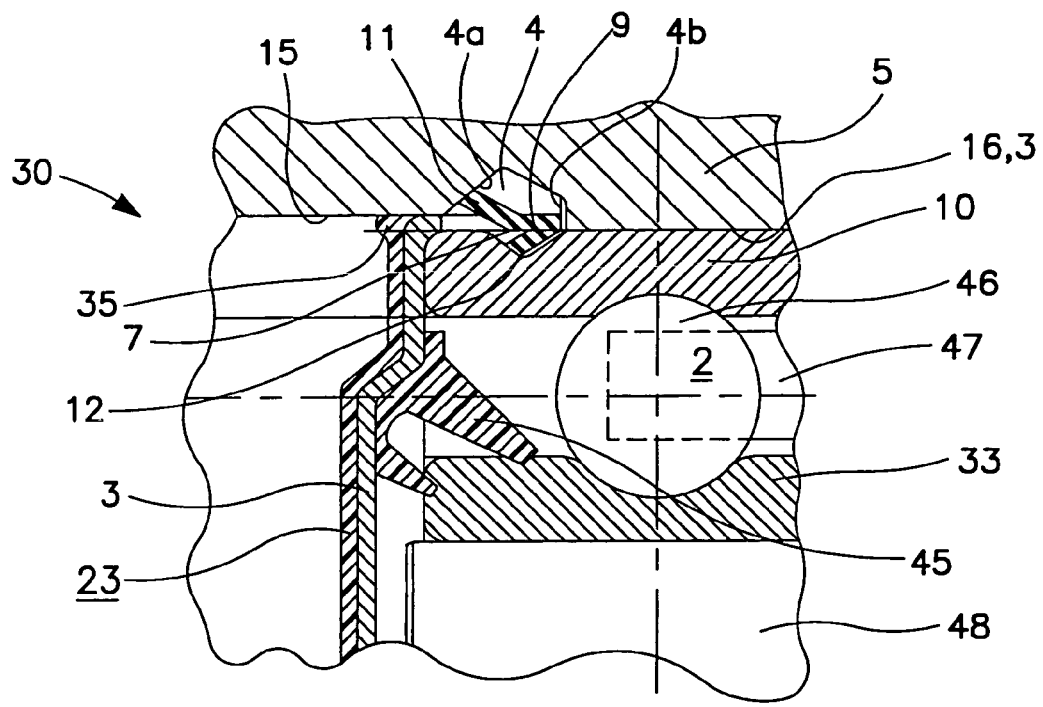
FIG. 6 is a further embodiment of a system for the axial securing of a roller bearing on a seat of the outer bearing ring in a bore, with a securing ring provided for securing the roller bearing and which is embodied as a covering cap for the roller bearing and whose securing ring, in addition, is provided with seals acting statically and dynamically.

System 30 of FIG. 6 comprises a securing ring 23 developed in the form of a cap, which axially covers the roller bearing 2 completely in one direction. In addition, for its protection, the securing ring 23 is provided on a side facing away from the roller bearing 2 completely with an elastomer layer, which transitions into a sealing bead 35. The sealing bead 35 is radially outwardly in contact against the housing 5 and "statically" seals the roller bearing 2 on the seat of the securing ring 23 against the region 15. The securing ring 23 is furthermore provided with a two-lipped seal 45, which seals the roller bearing 2 against the loss of lubricant from the roller bearing 2.

Various modifications of the system of the invention may be made without departing from the spirit or scope thereof and it is to be understood that the invention is intended to be limited as defined in the appended claims.

What we claim is:

1. A system for securing a roller bearing in axial directions relative to a cylindrical seat, the system comprising at least one first circumferential groove of the seat and with at least one securing ring, in which the securing ring adjoins with a disk-form section an axially outer side of a first bearing ring of the roller bearing and in which the securing ring comprises elastically flexible first securing clips projecting from the securing ring, which engage the circumferential groove, the system further comprises at least one second circumferential groove, where the securing ring comprises elastically flexible second securing clips projecting from the securing ring which engage the second circumferential groove in the first bearing ring, the first securing clips and the second securing clips are disposed between the first bearing ring and the seat and are in contact in an axial direction in the particular circumferential groove and the securing ring is in contact on the seat at least opposite to the first securing clips.

2. The system of claim 1, wherein the first securing clips and the second securing clips are in contact in an axial direction in the particular circumferential groove and the securing ring is in contact on the seat at least opposite to the first securing clips.

3. The system of claim 1, wherein the first securing clips and the second securing clips are each inclined with respect to the axial directions.

4. The system of claim 3, wherein the first securing clips and the second securing clips are stayed on inner faces inclined in axial directions of the particular circumferential grooves.

5. The system of claim 1, wherein the first circumferential groove is disposed radially opposite to the second circumferential groove.

6. The system of claim 1, wherein the second circumferential groove is developed radially outwardly on an outer bearing ring of a bearing and is disposed radially opposite to the first circumferential groove.

7. The system of claim 1, wherein the securing ring is provided at the circumference with U-form cutouts and the securing clips encompassed by the cutouts project at least partially out of the securing ring.

8. The system of claim 1, wherein the section is developed in the form of an apertured disk and at least partially covers axially the first bearing ring at the front side.

9. The system of claim 1, wherein a cap-form securing ring in which the section is disposed axially adjacent to a second bearing ring and covers axially the bearing rings at the front side.

10. The system of claim 1 wherein an elastic seal is fixedly on a section of the securing ring, in which the seal is at least in contact on a second bearing ring which is concentric with the first bearing ring as well as rotatable.

11. The system of claim 1 wherein an elastic seal is fixedly on the section of the securing ring, in which the seal is at least in contact on a second bearing ring which is concentric with the first bearing ring as well as rotatable.

12. The system of claim 1 wherein an elastic seal is fixedly on the first section of the scorning ring, in which the seal is at least in contact on a shaft, which is concentric with the first bearing ring as well as rotatable, forming a scaling.

13. The system of claim 1 wherein an elastic seal is fixedly on the section in which the seal is in contact on the seat forming a sealing.

14. The system of claim 1 wherein a cap-form securing ring in which the section is disposed axially adjacent to a second bearing ring and which therein covers the bearing rings axially at the front side, in which the second bearing ring is concentric with the first bearing ring and rotatable and the section is axially adjacent to a shaft disposed concentrically with the bearing rings in one of the axial directions, and the system further is provided with an elastic seal fixedly on the section, with the seal being at least in contact forming a sealing on the seat.

* * * * *